(12) United States Patent
Park et al.

(10) Patent No.: US 6,731,305 B1
(45) Date of Patent: May 4, 2004

(54) CAMERA SYSTEM WHICH RECORDS CAMERA IDENTIFICATION IN IMAGE FILE

(75) Inventors: Michael C. Park, Portland, OR (US); David Kaiman, Portland, OR (US)

(73) Assignee: iMove, Inc., Portland, OR (US)

( * ) Notice: Subject to any disclaimer, the term of this patent is extended or adjusted under 35 U.S.C. 154(b) by 279 days.

(21) Appl. No.: 09/904,390

(22) Filed: Jul. 12, 2001

Related U.S. Application Data

(63) Continuation-in-part of application No. 09/697,605, filed on Oct. 26, 2000.
(60) Provisional application No. 60/218,604, filed on Jul. 17, 2000.

(51) Int. Cl.⁷ .................................................. G09G 5/00
(52) U.S. Cl. ..................... 345/629; 345/581; 345/589; 348/36; 348/37; 348/38; 348/39; 348/231.3; 348/231.6; 348/218.1
(58) Field of Search ........................... 348/36–39, 231.3, 348/231.6, 218.1; 345/581, 589

(56) References Cited

U.S. PATENT DOCUMENTS

| | | | | |
|---|---|---|---|---|
| 3,740,469 A | * | 6/1973 | Herndon ..................... 348/36 |
| 4,462,045 A | * | 7/1984 | Norris ........................ 348/159 |
| 4,472,740 A | | 9/1984 | Doi | |
| 5,448,287 A | * | 9/1995 | Hull ............................. 348/39 |
| 5,592,321 A | * | 1/1997 | Elberbaum ................... 398/45 |
| 5,708,469 A | * | 1/1998 | Herzberg ..................... 348/39 |
| 5,923,791 A | * | 7/1999 | Hanna et al. ............... 382/295 |
| 6,141,034 A | * | 10/2000 | McCutchen .................. 348/36 |
| 6,335,722 B1 | * | 1/2002 | Tani et al. .................. 345/173 |
| 6,335,754 B1 | * | 1/2002 | Endo et al. .................... 348/37 |
| 6,507,363 B1 | * | 1/2003 | Anderson et al. ........ 348/231.9 |
| 6,519,046 B1 | * | 2/2003 | Kinjo ........................ 358/1.1 |
| 6,522,325 B1 | * | 2/2003 | Sorokin et al. ............. 345/427 |

\* cited by examiner

*Primary Examiner*—Matthew C. Bella
*Assistant Examiner*—Mike Rahmjoo
(74) *Attorney, Agent, or Firm*—Fenwick & West LLP

(57) ABSTRACT

A camera which has a plurality of subsystems which simultaneously capture a plurality of single view images which together form a panorama. An identification of the particular camera that produced a set of images is recorded in a file along with the images produced by the camera. The characteristics of each particular camera are also recorded either in the camera or in a separate file. The program used to seam a set of single view image then has available information concerning the camera that produced the images and the parameters of that particular camera. Using the available information the seaming program can compensate for the characteristics of the particular image capture device that produced a particular set of images.

25 Claims, 5 Drawing Sheets

CAMERA SYSTEM WHICH RECORDS CAMERA IDENTIFICATION IN IMAGE FILE

RELATED APPLICATIONS

This application (1) claims priority under 35 U.S.C. §119(e) to U.S. provisional application Serial No. 60/218,604 filed Jul. 17, 2000 entitled "Camera System Which Records Camera Identification in Image File;" and (2) is a continuation-in-part of U.S. patent application Serial No. 09/697,605 filed Oct. 26, 2000 entitled "System and Method for Camera Calibration" by Michael C. Park and Scott Wilson. The specification and drawings of the above listed applications are incorporated herein by reference. This application also incorporates by reference co-pending U.S. patent application Ser. No. 09/338,790 filed Jun. 23, 1999 entitled "System for Digitally Capturing and Recording Panoramic Movies" by Scott Gilbert, David Kairnan, Micbael C. Park and G. David Ripley; and co-pending U.S. patent application Ser. No. 09/602,290 filed Jun. 23, 2000 entitled "Interactive Image Seamer for Panoramic Images" by Michael C. Park and Scott Gilbert.

FIELD OF THE INVENTION

The present invention relates to photography and more particularly to digital cameras.

BACKGROUND OF THE INVENTION

Panoramic images are generally produced by seaming together a number of single view images. However, it is very difficult (if not impossible) to obtain a number of single view images which fit together exactly to form a panorama. In general the single view images must be modified slightly in order to make them fit together into a panorama.

U.S. patent application Ser. No. 09/602,290 filed Jun. 23, 2000 describes a program for interactively seaming a plurality of single view images into a panorama. The program described in application Ser. No. 09/602,290 allows an operator to modify the parameters of single view image such as heading, pitch, bank, offset, brightness and contrast so that the images will fit together to form a panoramic image.

U.S. patent application Ser. No. 09/338,790 filed Jun. 23, 1999 entitled "System for Digitally Capturing and Recording Panoramic Movies" describes a system for capturing multiple single view images which can be later seamed into panoramas. The camera shown in application Ser. No. 09/338,790 includes six lenses each of which can capture a single view image. The images captured by the lenses are transmitted to a computer which places the images in files for later processing. An interactive seamer program such as that shown in patent application Ser. No. 09/602,290 can be used to process the images, that is, to seam the single view images into panoramas.

U.S. patent application Ser. No. 09/697,605 describes a system for calibrating a camera, that is, for determining the parameters of a particular camera that can be used to modify images taken by the camera so that images will fit together into a panorama.

SUMMARY OF THE INVENTION

The present invention provides an improvement for a camera which has a plurality of subsystems that capture a plurality of single view images which together form a panorama. Factors such as the mechanical alignment of the image sensing devices, the field of view of the various lenses, the pincushion and skew of the lenses, and parallax errors, give each image capture subsystem its own special characteristics. The operation of seaming the images from such a camera into a panorama is facilitated if one knows the particular characteristics of the image capture subsystems which produced the images, that is, if one knows the modifications which must be made to images from the camera in order to seam the images into a panorama without artifacts.

The present invention records the identification of the particular camera that produced a set of images along with the images produced by the camera. The characteristics of the particular camera are also recorded either in the camera or in a separate file. The program used to seam a set of single view image then has available information concerning the camera that produced the images and it can compensate for the characteristics of the particular image capture device that produced that particular images.

DETAILED DESCRIPTION

Figure 1A:
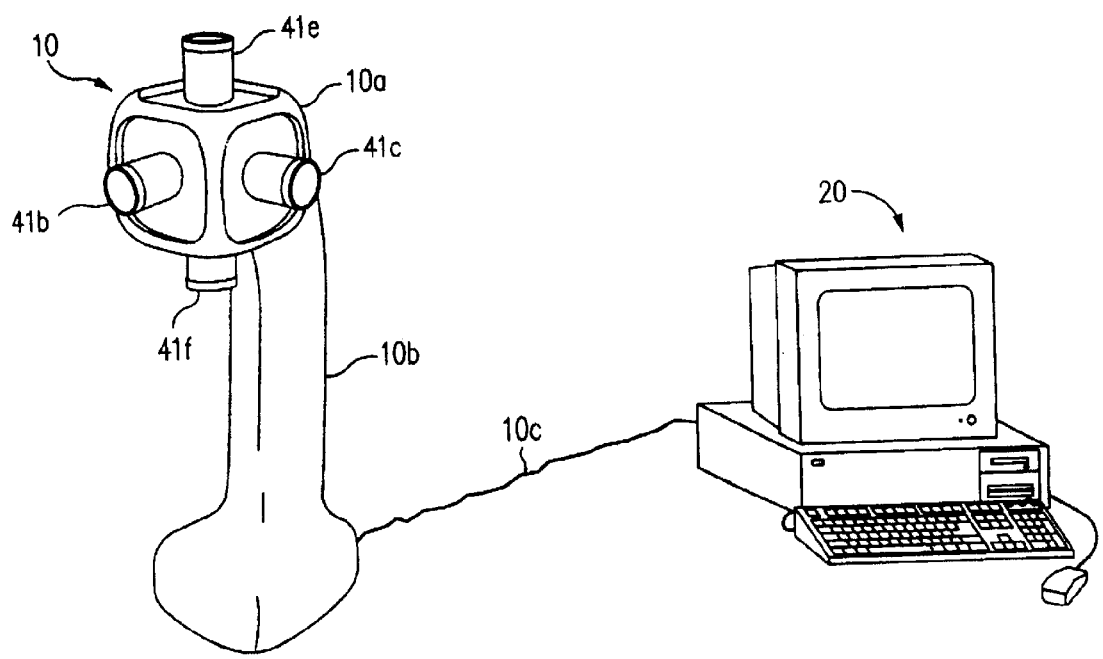
FIG. 1A is a diagram of the overall system.
Figure 1B:
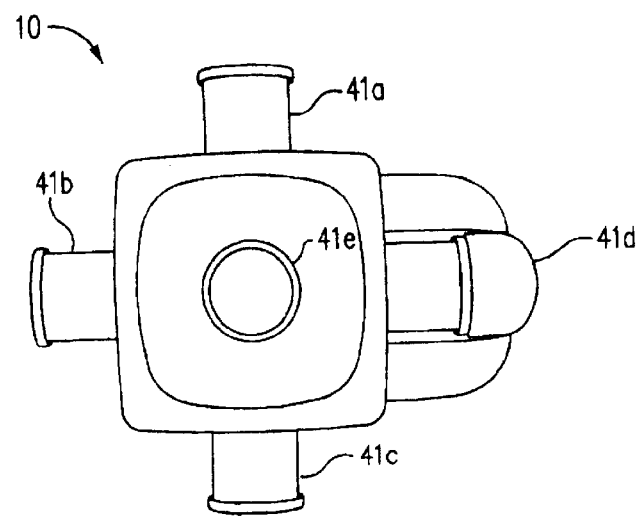
FIG. 1B is a top view of the camera.
Figure 2:
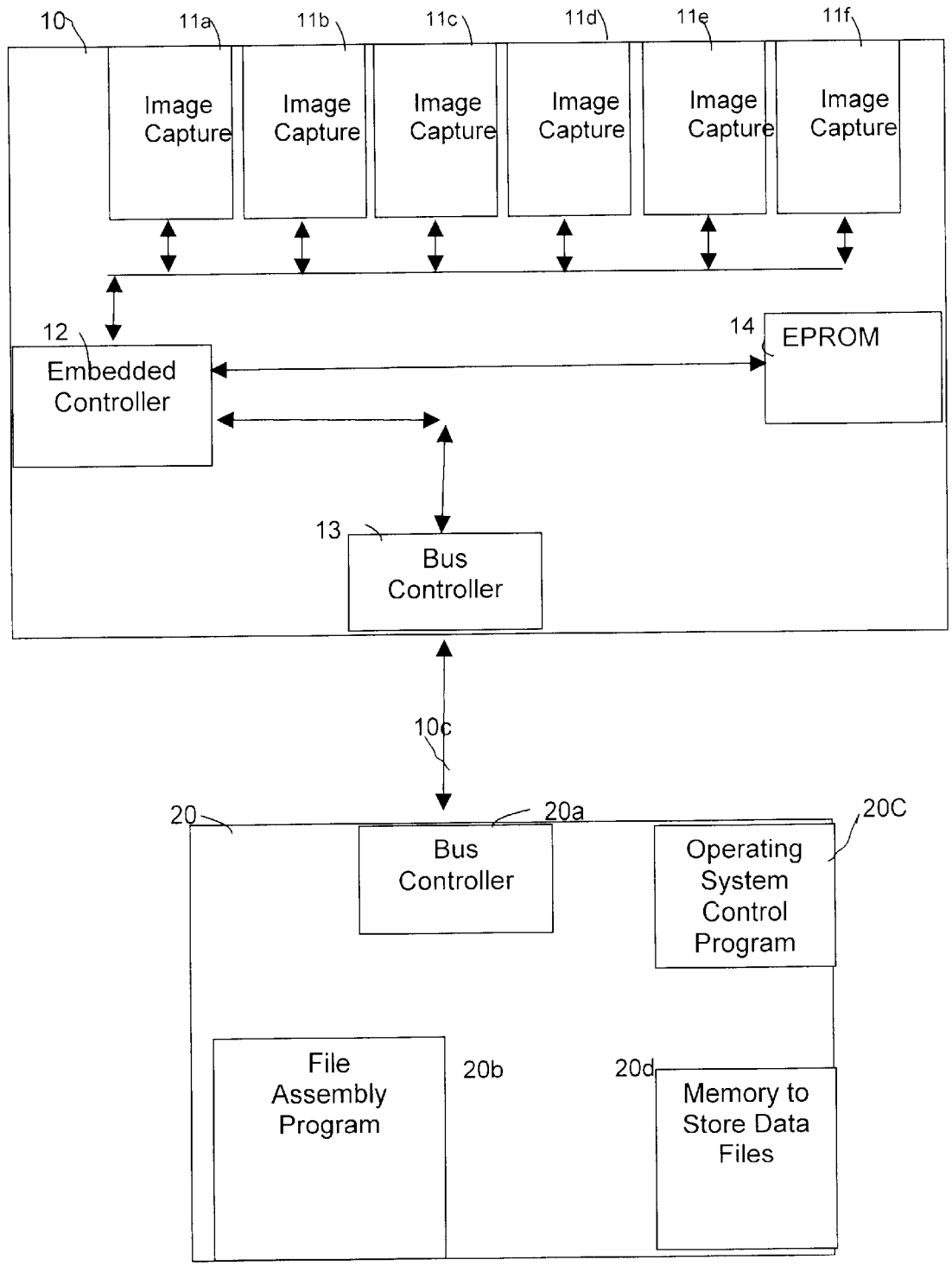
FIG. 2 is an overall block circuit diagram of the system.

An overall view of a first embodiment of the invention is shown in FIG. 1A. The system includes a multi-lens camera 10 and a computer 20. FIG. 1B is a top view of camera 10 which shows the lenses not visible in FIG. 1A. The camera 10 includes six lenses 41a to 41f, one on each side of the cubic. A bus 10c connects the camera 10 to the computer 20. The bus 10c transmits JPEG images from camera 10 to computer 20 and it transmits control signals bi-directionally between camera 10 and computer 20. Bus 20 is a conventional bus such as the commercially available "Hotlink" bus. Other bus systems such as the bus system know as "fire wire" could alternately be used. As shown in FIG. 2, the camera 10 includes image capture and compression circuitry 11a to 11f. One of the image capture and compression units 11 is associated with each of the lenses 41a to 41f. The camera 10 also includes an embedded controller 12, and a bus controller 13. The specific details of image capture and compression circuitry 11a to 11f, the embedded controller 12, and the bus controller 13 are conventional and do not form a part of the present invention. An example of such circuitry is shown in co-pending application Ser. No. 09/338,790. Other similar optics and circuitry available in various electronic cameras can also be used to capture images.

Image capture devices 11a to 11f provide a stream of digital JPEG images that are sent to the computer 20 via bus 10c. Embedded controller 12 activates image capture devices 11a to 11f simultaneously to capture a set of single view images that can be seamed into a panorama. The image capture devices can be activated sequentially at a selected frame rate (for example, at 15 or 30 frames per second) to capture a series of set of images, each set constituting images that can be seamed into a panorama. The images are compressed and sent sequentially to computer 20. Computer 20 provides control signals to camera 10 via bus 10c. The control signals from computer 20 start and stop the operation of the camera and set control parameters such as frame rate, aperture, etc. This is done through embedded controller 12 in a conventional manner.

Even with a high quality manufacturing process, each camera 10 that is manufactured has slightly different characteristics. For example, the differences or anomalies can result from:

a) The particular and specific mechanical alignment of the optical lenses and internal image sensor devices relative to each other.

b) Mechanical tolerances/variations during manufacture & fabrication which cause slight sensor/camera "pointing or aiming" errors.

c) Keystone error caused by misalignment of lens optical axis to center pixel of CCD (the Charged Coupled Device that senses the image in each image capture subsystem 11a to 11f)

d) Normal variances and anomalies in internal lens structures such as FOV (Field of View), Pincushion and/or Skew.

e) Parallax Errors.

f) Issues associated with the fact that each camera has a somewhat different physical location, and yet at the seam in a panorama, multiple cameras are "looking" at a common point. As distance increases between camera lenses, the problem is exaggerated. As distance decreases between camera and subject, the problem is exaggerated.

As a result of the specific characteristics of each individual image capture device artifacts are created when the individual single view images are seamed into a panorama unless the images are appropriately modified. That is, there will be artifacts or visual anomalies unless each of the images is slightly modified prior to seaming into a panorama.

The most elementary technique that can be used to eliminate artifacts created by seaming images together into a panorama is to (a) seam the images, (b) visually observe the artifacts (c) use and image editing program, such as Adobe Photoshop to edit or modify the individual single view images, and (d) then re-seam the modified images into a panorama. The process is repeated until the artifacts have been eliminated to the degree necessary.

Co-pending application Ser. No. 09/602,290 filed Jun. 23, 2000, describes a computer program (called an interactive seaming program) that allows an operator to modify the single view images interactively as they are seamed. Such a program is now commercially available form iMove Inc. of Portland, Oreg. This program provides a tool that facilitates seaming together a number of single view images into a panorama. With the program referenced above, the individual single view images can be modified before they are seemed in order to eliminate artifacts in the seamed panorama. The seaming program allows an operator to enter parameters such as Heading, Pitch, Bank Length, Offset X, offset Y, Brightness and Contrast, for each image being seamed. The images are modified according to these parameters before they are seamed into a panorama. If when the panorama is viewed, artifacts are still present, the parameters can be modified and the process repeated until the artifacts are no longer visible.

The values of the parameters such as Heading, Pitch, Bank Length, Offset X, offset Y, Brightness and Contrast which are appropriate for each particular single view image are at least in part dependent upon the particular image capture device that created the particular image. Thus, information concerning the particular camera that created a particular image can be advantageously used to facilitate seaming images from that particular camera. The present invention makes available to the seaming program the parameters needed to seam a particular set of images.

With the present invention, the camera 10 includes an EPROM 14. The EPROM 14 contains a camera ID (i.e. a serial number unique to each particular camera that is manufactured). The ID in EPROM 14 identifies a particular camera 10. That is, each camera 10 that is manufactured is assigned (and has stored in EPROM 14) a unique serial number that identifies the particular camera. Computer 20 can send a control signal to embedded controller 12 that causes controller 12 to reads the ID from EPROM 14 and sends the ID to computer 20.

Figure 3:
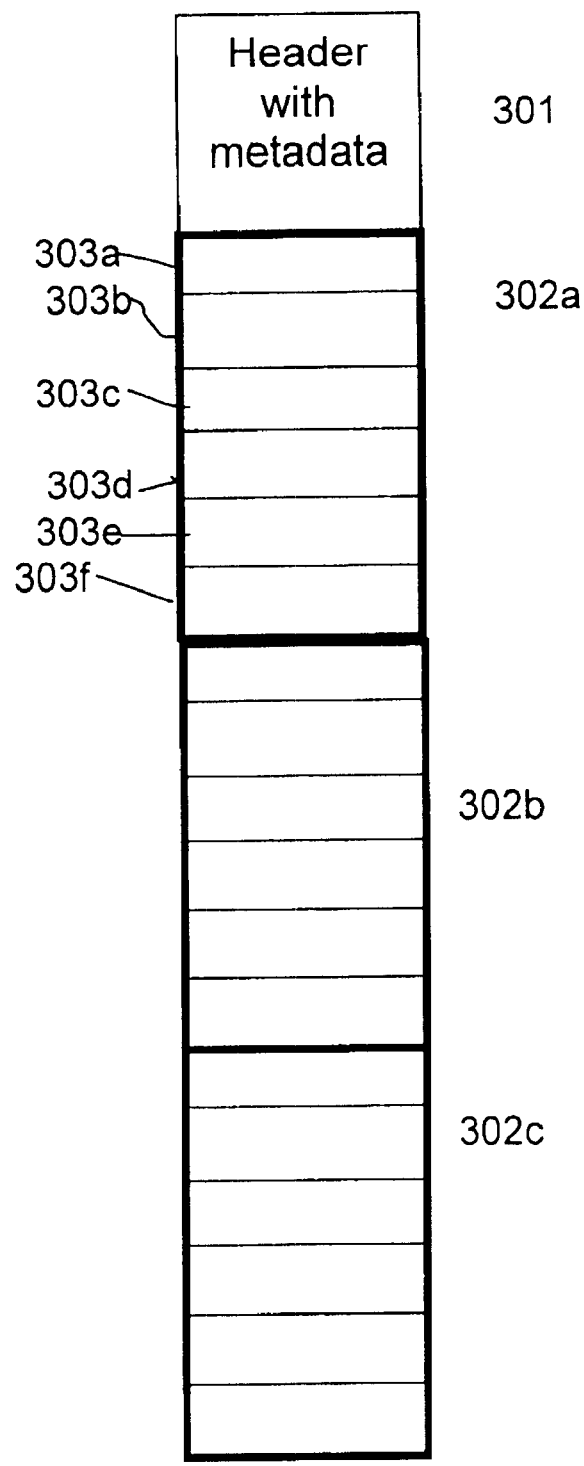
FIG. 3 illustrates the file structures.

Computer 20 has a file assembly program 20b. File assembly program 20b assembles the JPEG images from camera 10 into files as shown in FIG. 3. Each file includes a header with metadata 301 and a series of frames 302a to 302c. While only three frames are shown a typical file would include many more frames. Each frame contains six images 303a to 303f one from each image capture device 11a to 11f.

The metadata 301 includes the conventional type of file header information, giving information such as the structure and length of the file. However, unlike prior art files of images, the metadata 301 also includes the ID of the camera that created the images. Thus, when the file of images is stored or transferred to another computer, the identity of the computer that created the images is available.

Computer 20 also includes a control program 20c, a memory device 20d and conventional I-O. The computer 20 can also include the seaming program; however, in the first embodiment, the images are moved to a separate computer 400 (shown in FIG. 4) for seaming. In this first embodiment, the EPROM 14 merely includes a camera ID. As described later, in alternate embodiments, the EPROM 14 can also be used to store camera calibration parameters.

Figure 4:
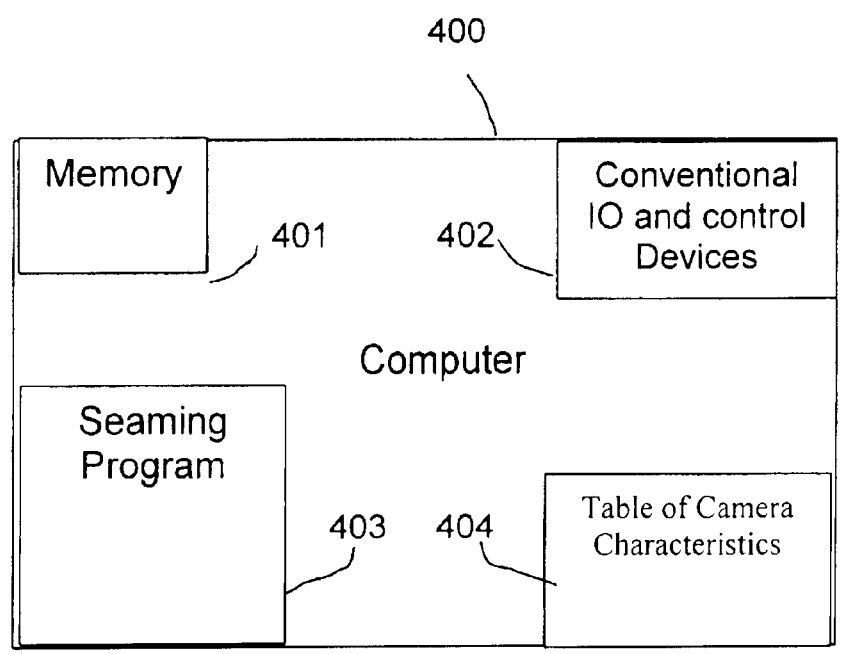
FIG. 4 is a block diagram of the computer.

FIG. 4 shows a computer 400 that includes a memory 401, conventional IO devices 402 and a seaming program 403. A table of camera characteristics 404 is also stored in computer 400. Table 404 gives the camera characteristics associated with each camera ID, that is, table 404 gives the modifications or settings necessary to seam images from each camera. For each particular camera (i.e. for each particular camera I.D.) table 404 includes at least some of the parameters necessary to seam the mages from each particular camera into a panorama. How the data entered into this table is generated will be described later.

Seaming program 403c can for example be the Interactive Seaming program marketed by iMove Corporation (and which is described in patent application Ser. No. 09/602,290 filed Jun. 23, 2000). With such a program, in order to seam an image without artifacts, the operator must enter parameters that modify the various single view images. With the present invention, these parameters are established for each particular camera, and stored in table 404. That is, for each particular camera ID table 404 gives the parameters necessary to seam images from that particular camera. Thus, since the identity of the camera that created a set of images is included in the header of the file that contains the images, the parameters necessary to seam a particular set of images are available to the seaming program 403. Providing the identification of the camera that created a set of images together with the images, and having stored a set of parameters for each different camera, eliminates the need to manually determines the appropriate set of parameters needed to seam a set of images. While the stored parameters can be used to seam a set of images, in some situations additional manual modification of the images may be desirable to achieve a high level of precision in the seaming operation.

Figure 5:
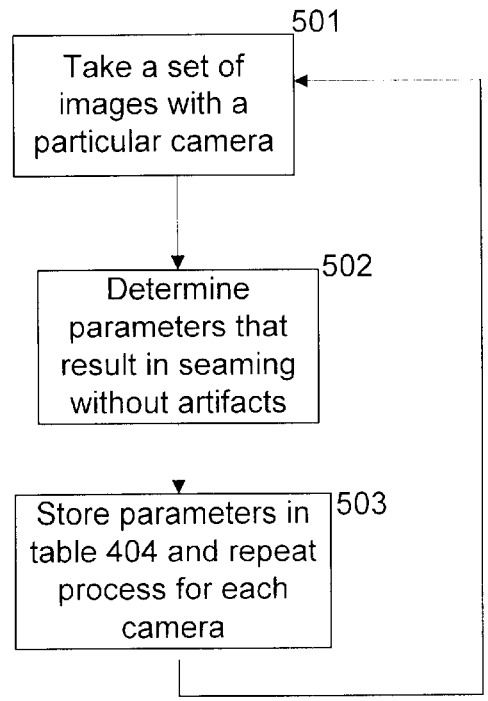
FIG. 5 is a program process flow diagram showing the operation of the system.
Figure 5:
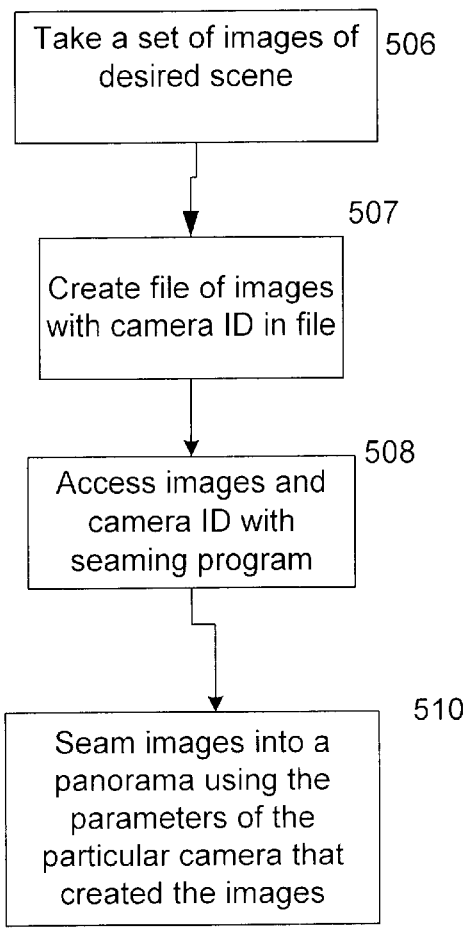

The overall process is illustrated by the flow diagram in FIG. 5. First as indicated by block 501, the characteristics of each camera are measured. This can be done off line. How the camera characteristics are measured forms no part of the present invention. The characteristics can, for example, be measured by taking a series of single view images with a particular camera, and then determining the parameters or settings for a seaming program that will result in panoramas which have a minimum number of artifacts (block 502). The settings so determined are then stored in table 404 as indicated by block 503. Alternatively the appropriate parameters necessary to seam images from a particular camera can be determined automatically as described in application serial number 09/697,605 filed Oct. 26, 2000 entitled "System and Method for Camera Calibration".

This calibration process is repeated for each camera that is manufactured. Thus there will be a set of parameters for each camera stored in table 404. Each set of parameters will be associated with and stored with (or indexed to) a particular camera ID.

The step indicated by block 506 is the actual operation of the camera. One or more sets of images are recorded using a particular camera. As indicated by block 507, these images are put into a file such as that shown in FIG. 3. The file so created is transferred to the computer that is to do the seaming as indicated by block 508 and the images and camera ID are accessed. The images are seamed using the parameters associated with the particular camera. That is, the parameters stored in table 404 for a particular camera are made available to the seaming program when images from that particular corner are being seamed. This can be done by displaying the parameters to the operator and having the operator enter the parameters into the seaming program. Alternatively the parameters can be automatically entered into the seaming program from the file header when the images from a file are entered into the seaming program.

In certain cases the operator of the seaming program may be able to use the stored parameters directly to do the seaming operation. In other situation, the operator would use the stored parameters as a starting place and make further modifications as necessary. In any event having parameters for the camera that created the images available, greatly simplifies the seaming operation.

In an alternate embodiment a simple program would read the appropriate camera parameters from table 404 and directly enter these parameters into the seaming program. The seaming operation could then proceed automatically without operator intervention. If artifacts are present in the resulting panorama, the operator can change the parameters and re-seam the images. The changes necessary can be recorded so that the program will "learn" and improve its performance as images are seamed.

As described herein the seaming operation takes place in a separate computer 400; however, alternatively, the seaming operation could take place in the computer 20. In such a case computer 20 would have a separate seaming program that would operate similar to seaming program 403.

In the embodiment described above, only a number or other indicia identifying the particular camera that recorded particular images is stored in each image file and the characteristics of each camera are stored in table 404. Alternatively, The characteristics of each particular camera (i.e. the parameters necessary to seam images from each particular camera) could be stored in the camera itself, and these characteristics could then taken from the storage in the camera and stored in each file of images. In such an embodiment, the header of the file containing the images would have the actual parameters necessary to seam the particular images into a panorama.

As used herein the term "camera ID" is meant to mean either a number or other indicia that identifies a particular camera or a set of camera characteristics that are peculiar to a particular camera. The term camera parameters and camera characteristics means the parameters needed to seam images from a particular camera. The particular parameters required will in general depend on the particular seaming program used. That is, the parameters determined in step 502 in FIG. 5, will be the parameters stored and used in the seaming operation 510.

In some embodiments, the camera is inside of a structure such as for example a waterproof structure for underwater operation. Such a structure would have ports or windows through which the cameras acquire images. Such a structure can change the calibration parameters and for best results, the camera must be calibrated (i.e. the parameters for seaming determined) while the camera is inside the structure.

In another alternate embodiment of the invention, the camera 10, the file assembly program 20b and the memory 20d are inside a single portable unit. Numerous different embodiments are possible with components assembled in different combinations in different units.

It is noted that image capture units 11a to 11f include compression circuits to compress the captured images. This facilitates transfer to the images to unit 10c. Alternately, the compression can facilitate storage of the images inside unit 10.

It is noted that the number stored in EPROM 14 merely need be some type of identifying indicia that identifies a particular unit 10. Herein the term serial number is used to mean any type of indicia that can identify a particular unit.

While the invention has described with reference to preferred embodiments thereof, it should be understood that various changes in form a detail may be made without departing from the sprit and scope of the invention.

We claim:

1. A camera system for capturing a plurality of images that can be seamed into a panorama comprising:

a plurality of subsystems, each subsystem having a camera for capturing a single view image, a storage device in said camera system for storing a unique serial number identifying a particular camera system, an image storage subsystem for storing in a file a set of single view images, one from each of said subsystems together with the serial number of the camera system that captured said images.

2. A system for creating panoramic images that includes;

a camera for recording a plurality of single view images, said camera including an identification number stored in machine readable form, storage means for storing images in a file along with the identification number of the camera that created the images, memory storage which stores said identification number along with the parameters of the particular camera associated said identification number, a seaming program that accesses said single view images and the identification number of the camera that created said single views images and which seams said single view images into a panorama using parameters associated with the particular identification number.

3. A system for recording images comprising
   a camera for taking a plurality of single view images,
   means for electronically storing in said camera a serial number of said camera,
   means for recording in a file said single view images along with the serial number of the camera that created said single view images.

4. A system for forming a plurality of images into a panorama comprising:
   a control program for receiving a plurality of images that can be seamed into a panorama, wherein the images are captured by an image capture system having one or more image capture devices; and
   a file assembly program communicably coupled to the control program for creating one or more data structures that include the images and tat, for at least some of the images, further include a reference to the image capture device used to capture the image, wherein the reference can be used to access one or more image capture characteristics of the image capture device and the image capture characteristics can be used in seaming the image into the panorama.

5. The system of claim 4 wherein the reference to the image capture device includes a serial number of the image capture device.

6. The system of claim 4 wherein, for at least one image capture device, the file assembly program creates a data file that includes multiple images captured by the image capture device and that further includes the reference to the image capture device as metadata in the data file.

7. The system of claim 4 wherein the control program is further for creating a data structure that associates the image capture characteristics of one or more of the image capture devices with the references to the image capture devices.

8. The system of claim 4 wherein the reference to the image capture device is stored in the image capture system and the control program is further for accessing the image capture system to obtain the reference.

9. The system of claim 4 wherein the image capture characteristics of the image capture device are stored in the image capture system and the control program is further for accessing the image capture system to obtain the image capture characteristics.

10. The system of claim 4 wherein the images are digitally captured.

11. The system of claim 4 wherein within the data structures, the images are stored in a compressed format.

12. The system of claim 4 wherein the plurality of images comprises a plurality of sets of images, each set of images can be seamed into a panorama, and the sets are captured sequentially in time at a predetermined frame rate.

13. The system of claim 4 further comprising:
   the image capture system, wherein the control program is further for controlling the capture of images by the image capture system.

14. The system of claim 13 wherein the image capture system comprises:
   at least five image capture subsystems, all oriented orthogonally with respect to each other and capturing images simultaneously.

15. The system of claim 13 further comprising:
   a bus for communicably coupling the control program and the image capture system.

16. The system of claim 4 further comprising:
   a seaming program for accessing the data structures containing the images and the references to the image capture devices, for accessing image capture characteristics associated with the references, and further for seaming the images into a panorama using the image capture characteristics.

17. The system of claim 16 wherein the seaming program is further for accessing a separate data structure that associates the image capture characteristics of one or more of the image capture devices with the references to the image capture devices.

18. The system of claim 16 wherein the seaming program uses the image capture characteristics to adjust at least one of the following parameters: Heading, Pitch, Bank Length, Offset X, Offset Y, Brightness and Contrast.

19. A method for forming a plurality of images into a panorama comprising:
   receiving a plurality of images that can be seamed into a panorama, wherein the images are captured by an image capture system having one or more image capture devices; and
   creating one or more data structures that include the images and that, for at least some of the images, further include a reference to the image capture device used to capture the image, wherein the reference can be used to access one or more image capture characteristics of the image capture device and the image capture characteristics can be used in seaming the image into the panorama.

20. The method of claim 19 wherein the reference to the image capture device includes a serial number for the image capture device.

21. The method of claim 19 wherein the step of creating data structures comprises:
   for at least one image capture device, creating a data file that includes multiple images captured by the image capture device and that further includes the reference to the image capture device as metadata in the data file.

22. The method of claim 19 further comprising:
   creating a data structure that associates the image capture characteristics of one or more image capture devices with the references to the image capture devices.

23. The method of claim 19 further comprising:
   accessing the image capture system to obtain the reference to the image capture device.

24. The method of claim 19 further comprising:
   accessing the image capture system to obtain the image capture characteristics.

25. The method of claim 19 further comprising:
   accessing the data structures containing the images and the references to the image capture devices;
   accessing image capture characteristics associated with the references; and
   seaming the images into a panorama using the image capture characteristics.

* * * * *